Oct. 16, 1956  E. H. DORMAN  2,766,577
BROOM TYPE HAND RAKE CONSTRUCTION
Filed Nov. 3, 1953  2 Sheets-Sheet 1
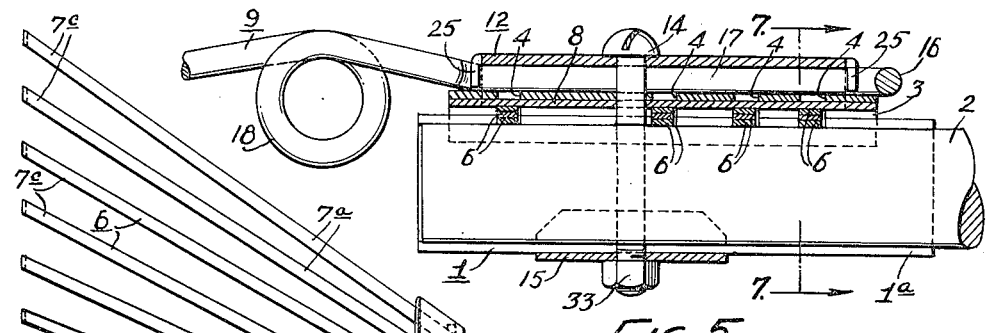
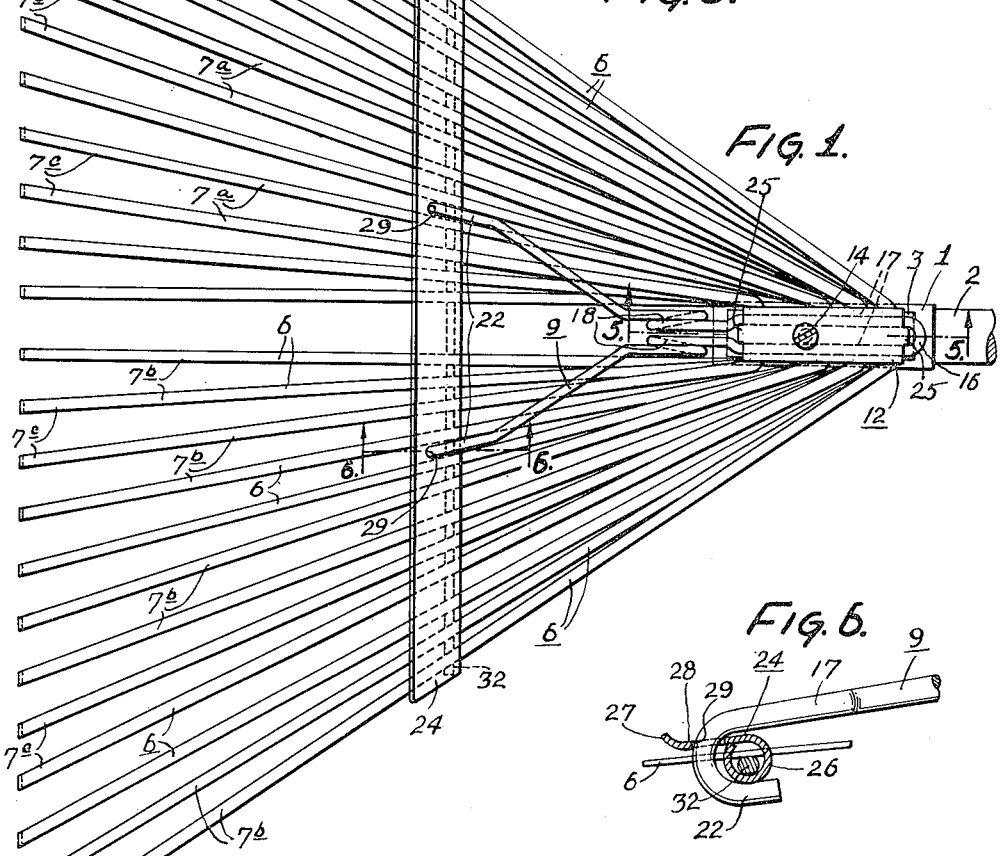
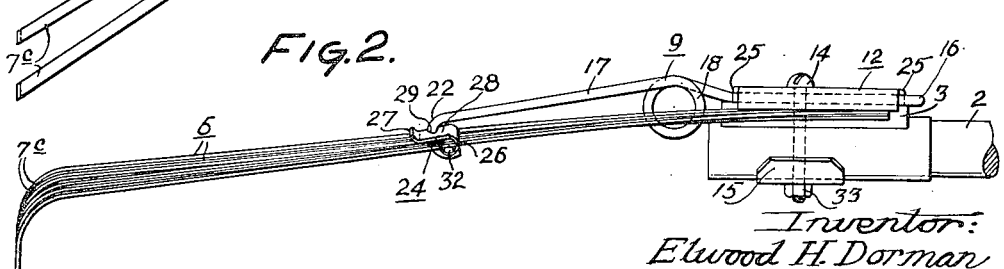
Inventor:
Elwood H. Dorman
by his Attorneys
Howson & Howson

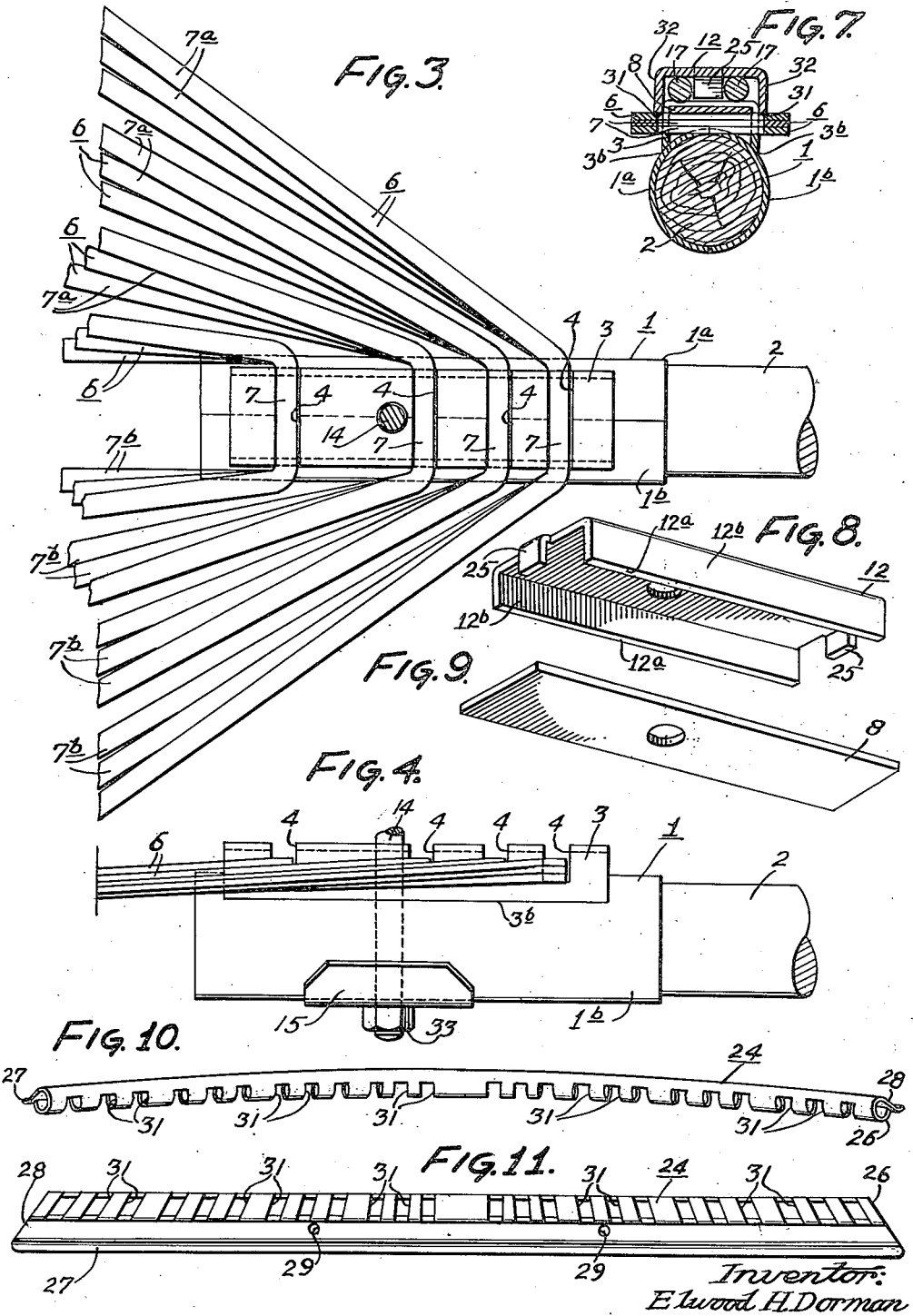

United States Patent Office 2,766,577
Patented Oct. 16, 1956

2,766,577

BROOM TYPE HAND RAKE CONSTRUCTION

Elwood H. Dorman, Philadelphia, Pa., assignor, by mesne assignments, to H. K. Porter Company, Inc. of Pittsburgh, Pittsburgh, Pa., a corporation of Pennsylvania Application November 3, 1953, Serial No. 389,931

4 Claims. (Cl. 56—400.17)

This invention relates to an improvement in rakes and more particularly to rakes of the resilient tine type especially adapted for raking leaves, grass clippings, etc.

One object of the invention is to provide a rake of the stated type wherein the resilient tines are more readily removable and replaceable.

Another object of the invention is to provide a rake of the stated type wherein the tine-retaining member, while forming an integral part of the handle ferrule, is remote from the ferrule socket and leaves the socket portion of the ferrule free for expansion and contraction to compensate for deviations within normal commercial tolerances from the handle dimensions for which the ferrule is designed.

A further object of the invention is to provide a combined ferrule and slotted tine-retainer which permits the mounting of the tines in multiple in the slots and materially reduces the cost of manufacture as hereinafter set forth.

The invention resides also in certain novel structural details and arrangements hereinafter described and illustrated in the attached drawings wherein:

Fig. 1 is a plan view of a rake made in accordance with the present invention;

Fig. 2 is a side elevational view of the rake of Fig. 1;

Fig. 3 is an enlarged fragmentary plan view of the rake of Fig. 1 with certain elements removed for the sake of clarity;

Fig. 4 is a side elevational view of the rake shown in Fig. 3;

Fig. 5 is an enlarged view taken substantially on line 5—5 of Fig. 1;

Fig. 6 is an enlarged view taken substantially on line 6—6 of Fig. 1;

Fig. 7 is a view taken substantially on line 7—7 of Fig. 5;

Fig. 8 is an enlarged view in perspective of the spacer box cover employed in the present invention;

Fig. 9 is an enlarged view in perspective of the locking plate;

Fig. 10 is a rear elevational view on an enlarged scale of the forward tine spacer used in the rake of the invention; and, Fig. 11 is a plan view of the spacer shown in Fig. 10.

With reference to the drawings and more particularly to Figs. 1, 5 and 7, the rake therein disclosed comprises an elongated ferrule 1 for the reception of a conventional handle 2. A channel-shaped tine-receiver 3 having transverse slots 4 is integrally attached to the ferrule 1, and the ferrule is divided in a plane normal to the top surface of the receiver so that it consists in effect of two semi-cylindrical sections 1a and 1b which are held together by the receiver 3, the longitudinal free edges 3a and 3b of the receiver being joined respectively to the sections 1a and 1b on lines parallel to the longitudinal confronting edges of the latter. In assembly, the receiver 3 will occupy a position at the top of the handle. The construction affords a degree of flexibility in the ferrule which permits it to conform readily under pressure to the handle so as to establish a tight connection, as hereinafter set forth.

Each of the slots 4 is occupied by a number of substantially V-shaped tine elements 6, each said element having a short straight midsection 7 which fits the receiving slot, and the two elongated arms 7a and 7b which diverge from the said midsection and which constitute the functioning tines. These arms or tines are resilient and in the present instance take the form of flat springs each having an offset free outer end portion 7c. The angles of divergence and the effective lengths of the arms vary in the several tine elements so that collectively the arms or tines extend in fan-like formation from the ferrule as best shown in Fig. 1. It will be noted that while a line drawn through the bottom of any of the slots 4 (see Fig. 7) will intersect the wall of the ferrule approximately tangentially to the circle defining the inner surface of ferrule, the tine-retaining means is such that the ferrule socket is left free and unobstructed for reception of the handle.

The tine elements are locked in the slots 4 by a plate 8 (see Fig. 9) which fits into the top of the receiver 3 above the tine elements as shown in Fig. 5. The locking plate 8, the top wall of the receiver and the ferrule are apertured in alignment for reception of a retaining bolt 14, and this bolt also passes through apertures in a saddle 15 at the underside of the ferrule and a channel-shaped cap member 12 which overlies the receiver 3. The lower edges 12a of the side flanges 12b of the member 12 bear upon the topmost tine element 6 in each of the slots 4, and the cap member also has at each end between the said flanges a depending tongue 25 the lower edges of which just clear the top of the receiver 3. The tongues 25 function in connection with a spring 9 the looped base portion 16 of which is fitted to the interior of the cap member 12. The base portion 16 is shaped so that the loop is in effect closed at each end, and the tongues 25 fit between the sides of the loop and respectively adjoin the closed ends of the latter so as to anchor the base portion 16 of the spring against both lateral and longitudinal displacement in the cap. The bolt 14 also passes through the loop 16 of the spring as shown in Fig. 1. The two arms 17 of the spring extend forwardly from the base portion 16 and diverge to terminate in hooks 22 which engage in apertures 29 in a tine spacer 24. Intermediate the terminal hooks and the base portion 16, each arm 17 is formed with an integral coil 18 disposed in vertical planes.

The spacer 24 is illustrated in Figs. 10 and 11 and also in Fig. 6. It consists of an integral strip of sheet metal beaded over at one edge into the form of a cylinder 26 and curved reversely at the opposite edge as indicated at 27, Fig. 6. This flange-like portion 28 is apertured for reception of the hooks 22 of the spring 9 the apertures being indicated at 29 in Fig. 6 and as best shown also in that figure, the hooks passing downwardly through the apertures 29 embrace the cylindrical portion 26 of the spreader and support the latter. As shown in Figs. 10 and 11, the underside of the cylindrical portion 26 of the spreader is slotted as indicated at 31 for reception of the respective tines 7a and 7b of the tine elements 6 and the angle of the slots 31 with respect to the longitudinal line of the spreader vary in accordance with the angularity of the tines which they respectively receive. The tines are locked in the slots 31 by means of a locking rod 32 which is passed longitudinally through the cylinder 26 below the tines as best shown in Fig. 6. It will be noted by reference to Fig. 10 that the spreader is slightly arched or curved from end to end symmetrically with respect to the midsection to afford a similar slight convexity to the fan-shaped system of tines. The rod 32 is normally straight and preferably resilient so that when inserted in the cylinder 26 as described above, it will be effectively retained in place without special retaining devices by friction alone.

In the assembly, the bolt 14 constitutes the sole means for securing the elements together, this bolt as previously set forth passes downwardly through the cap plate member 12, through the top wall of the receiver 3 and through the locking plate 8 then through the loop of the spring 9 then through an aperture at the handle 2, then through apertures in the top and bottom of the ferrule 1 and through the handle 2 which occupies the interior of the ferrule and finally through the saddle 15, the lower side of the saddle being engaged by the bolt-retaining nut 33. When the nut is tightened, the effect is to draw the edges of the cap plate down against the tops of the upper tine elements in the slots 4 and to clamp the loop 16 of the spring 9 between the cap plate and the top wall of the receiver 3. The bolt also places the ferrule 1 under diametric compression and this split ferrule by its own flexure and by flexure also of the integral receiver channel is permitted to flex into clamping engagement with the contained handle 2. In this action of the ferrule, the saddle 15 functions to distribute the stress imposed by the bolt over a substantial area of the underside of the ferrule the saddle acting also to retain the opposite sides of the ferrule in the flexed handle clamping positions.

The use of a single bolt is made possible by the fact that the receiver 3 and the associated tine retaining elements, including the member 12, constitute in effect an upper saddle which cooperates with the lower saddle 15 to distribute the clamping pressure of the bolt over an extended area of the ferrule 1.

As previously described, the tongues 25 of the cap member 12 immobilize the looped base portions 16 of the spring 9 against movement longitudinally of the ferrule and the entire organization is clamped solidly and rigidly by the retaining bolt. In this organization, the spring 9 functions to reinforce the resilient tines so as to regulate the flexure of the latter under the upward pressures against their downturned tips when the rake is operated in normal manner, and this action of the spring 9 is modified by the presence in the latter of the coils 18.

I claim:

1. In a rake of the type comprising a plurality of substantially V-shaped tine elements disposed to afford a fan-like assembly of relatively spaced resilient tines, together with a spreader for maintaining the tines in the said spaced relation, an integral tine element- and handle-receiver comprising a ferrule portion consisting of semi-tubular parts jointly forming a split tube and providing a handle-receiving socket, and a projection at the side of and extending in axial direction with respect to said ferrule portion and consisting of a channel member having terminal side edges thereof joined respectively to said semi-tubular parts at opposite sides of and parallel to one of the juncture lines of said parts and holding said parts together, said channel member containing transverse slots for reception of the apex portions of the said tine elements which slots extend substantially in non-intersecting relation to the socket so that the said apex portions of the tine elements when inserted in the slots will leave the socket substantially unobstructed, means detachably associated with the said slotted projection for releasably securing the said apex portions of the tines in the slots, and means for radially contracting the ferrule portion, said means including an approximately V-shaped saddle at the opposite side of the ferrule portion from the said channel member overlapping the confronting edge portions of the semi-tubular parts, together with a ferrule contracting bolt extending through the top wall of said channel member and through the ferrule portion at the lines of juncture of the semi-tubular parts and also through said saddle.

2. A rake according to claim 1 including a channel shaped cap overlying and embracing the top of the slotted channel member and secured by said bolt, and a spring having a base portion confined within the cap member and diverging arms extending longitudinally above the tines and connected at their outer ends to the spreader.

3. In a rake of the type comprising a plurality of substantially V-shaped tine elements disposed to afford a fan-like assembly of relatively spaced resilient tines, together with a spreader for maintaining the tines in the said spaced relation, a tine element- and handle-retaining fitting comprising a ferrule portion containing a handle-receiving socket, the wall of said socket being split longitudinally to afford generally radial expansion and contraction of the socket, means attaching the tine elements to the ferrule portion in non-intersecting relation to said socket, said tine-attaching means comprising a saddle structure at one side of the ferrule portion external to the socket and having transverse slots receiving the midsections of the tine elements, said structure having relatively spaced elongated side edges seated against and extending longitudinally of the ferrule portion, a single bolt diametrically intersecting said ferrule, means for anchoring one end of the bolt in said saddle structure, and a saddle member anchored by the bolt at the opposite side of the ferrule portion and having angularly diverging sides jointly embracing a circumferential portion of the wall of said ferrule portion, said saddle structure and saddle member forming elements of a clamp actuated by tightening the bolt to exert pressure on the walls of the ferrule portion tending to contract the latter, and means for locking the tine elements in the slots.

4. A rake according to claim 3 wherein the ferrule portion comprises semi-cylindrical sections joined respectively to the said edges of the saddle structure, and respectively engaged by the said diverging sides of the saddle member.

References Cited in the file of this patent

UNITED STATES PATENTS

| | | |
|---|---|---|
| 1,959,893 | Bailie | May 22, 1934 |
| 2,137,795 | Bailie | Nov. 22, 1938 |
| 2,149,429 | Finkes | Mar. 7, 1939 |
| 2,316,168 | James | Apr. 13, 1943 |